(12) United States Patent
Coar

(10) Patent No.: US 7,191,392 B1
(45) Date of Patent: Mar. 13, 2007

(54) SYSTEM AND METHOD FOR THE CREATION OF VIRTUAL INFORMATION PACKAGES

(75) Inventor: Michael J. Coar, McLean, VA (US)

(73) Assignee: Virpack.Com, Vienna, VA (US)

( * ) Notice: Subject to any disclaimer, the term of this patent is extended or adjusted under 35 U.S.C. 154(b) by 0 days.

(21) Appl. No.: 09/533,152

(22) Filed: Mar. 23, 2000

(51) Int. Cl.
G06F 17/30 (2006.01)

(52) U.S. Cl. ............ 715/512; 715/530; 715/515; 715/751; 707/10; 707/104.1; 235/462.07

(58) Field of Classification Search ............ 715/512, 715/530, 515, 751; 235/462, 462.07; 707/10, 707/104.1; 455/412.1, 413
See application file for complete search history.

(56) References Cited

U.S. PATENT DOCUMENTS

| | | | |
|---|---|---|---|
| 5,331,547 A * | 7/1994 | Laszlo .......................... 705/2 |
| 5,671,378 A * | 9/1997 | Acker et al. ................ 345/801 |
| 6,026,377 A * | 2/2000 | Burke ......................... 705/27 |
| 6,070,798 A * | 6/2000 | Nethery ................. 235/462.01 |
| 6,108,656 A * | 8/2000 | Durst et al. .................... 707/10 |
| 6,199,048 B1 * | 3/2001 | Hudetz et al. ................ 705/23 |
| 6,212,504 B1 * | 4/2001 | Hayosh ......................... 705/64 |
| 6,215,992 B1 * | 4/2001 | Howell et al. ............ 455/412.1 |
| 6,389,403 B1 * | 5/2002 | Dorak, Jr. ..................... 705/52 |
| 6,415,270 B1 * | 7/2002 | Rackson et al. ........... 705/36 R |
| 6,429,946 B1 * | 8/2002 | Bresnan et al. ............ 358/1.15 |
| 6,519,629 B2 * | 2/2003 | Harvey et al. .............. 709/204 |
| 6,546,385 B1 * | 4/2003 | Mao et al. ...................... 707/3 |
| 6,732,161 B1 * | 5/2004 | Hess et al. ................... 709/219 |
| 6,876,977 B1 * | 4/2005 | Marks .......................... 705/26 |
| 7,089,248 B1 * | 8/2006 | King et al. .................... 707/10 |
| 2003/0110443 A1 * | 6/2003 | Yankovich et al. ...... 715/501.1 |
| 2005/0246541 A1 * | 11/2005 | Ginter et al. ............... 713/176 |

OTHER PUBLICATIONS

Nava, "Report on XML Packaging, W3C Note Jul. 16, 1999" Adobe Systems, Inc. http://www.w3.org/xml/1999/07/xml-packaging-report.

* cited by examiner

Primary Examiner—Stephen Hong
Assistant Examiner—Matthew Ludwig
(74) Attorney, Agent, or Firm—Roberts Mardula & Wertheim, LLC

(57) ABSTRACT

A system and method for creation of virtual electronic containers for documents in electronic form. The system permits scanning and or electronic creation of documents together with a machine readable graphical code. The graphical code contains informational bout the documents that can be read without having to read the documents themselves. System components review the graphic code and determine contents, processing options and other workflow steps. Tolls associate with the creation of the electronic document container enforce creation rules to insure that electronic container conform to a structure that allows electronic dissemination of the container. Documents stored in the electronic container maintain the characteristics of the application that created them thereby allowing the documents to be viewed and manipulated using the application in which they were created.

24 Claims, 7 Drawing Sheets

SYSTEM AND METHOD FOR THE CREATION OF VIRTUAL INFORMATION PACKAGES

FIELD OF THE INVENTION

The present invention generally relates to the processing and interchange of information, data and documents in both paper based and electronic format. The present invention also relates to converting paper documents into an electronic form, while retaining index data information. More particularly the present invention is a system, which applies a standard approach for packaging a paper form and its data content, thereby providing a means by which the information may be transmitted in both a human and machine-readable format. Further, the present invention is an information collection and delivery vehicle that may contain an unlimited number of disparate objects in electronic form, which may be electronically delivered via disk, CD-ROM, Internet or other electronic delivery methods and present them in a fashion that facilitates automation and user interaction. In addition, the present invention is an electronic delivery and storage/archive system based on the information and delivery collection vehicle.

BACKGROUND OF THE INVENTION

Today, more and more emphasis is being placed on the dissemination of information in electronic form. Virtually all business related paper documents today are generated from a computer application and sent to a printer or a fax delivery vehicle. While present day technology has resulted in a vast amount of data and information being disseminated by electronic networks, such as computer networks, the Internet, and the like, the full information content of such communications does not provide the flexibility and utility still associated with hard paper copies of the same information. Some still prefer receiving printed information in hard copy form, which can be read, studied, and readily saved for future reference.

Unfortunately, the dissemination of printed material is cumbersome and slow as compared to the electronic transfer of information and data. Further, once information is in printed form, it is difficult to return the information and data content back to an electronic form. Therefore, a receiving party will need to either manually read and extract the relevant data content to be entered into another downstream computer system, or the documents may be machine scanned and imaged for either manual or automated conversion (through the use for example of OCR type technology) to electronic data, which then can be readily transferred. However, both manual and automated conversion and transfer are time consuming, susceptible to error, and often result in loss of portions of the original data content. In addition, OCR type forms extract of data from images is expensive and requires specific controls on the source documents to be successful. Where unconstrained forms are prevalent, OCR forms processing will still require a tremendous amount of manual intervention.

In environments where electronic files are used, there are still difficulties encountered by businesses trying to implement such files to transact business. As in many cases, a collection of different types of electronic files will comprise the transaction. One of the deficiencies of the presently known systems is that there is a lack of a single "container" that can hold various objects to better allow companies to interact or act as a general purpose electronic information delivery vehicle. Therefore, what is needed is a process to allow a disparate collection of different objects, be it electronic, or paper converted into electronic format be provided to a business or even and end user in a fashion the promotes ease of use an automation.

Accordingly, there is a need in industry to permit paper documents to be converted into electronic format while also retaining the relevant index data information. Further, it is desirable that this electronic format act as a standardized "container" for delivering information, such as documents, data and images via email, the Internet, on disk, or on CD, or in any other electronic form. The standardized container ideally would, among other functions, reproduce a copy of the original document that was converted. This standardized container would further be adaptable to a changing business environment where the source of the initial content may predominantly be paper documents to where as the industry shifts to more electronic content will still provide similar benefits. The standardized container would also provide information about its contents, commonly known as "meta-data." This meta-data would be provided in a manner that facilitates the development of browser applications as well as automation. Therefore, the standardized container would support any spectrum of content and present that content to a user or system in a fashion that promotes its use and automation. Further a system using this container would include delivery methods for supplying both customers and business partners with instant information that is needed. In other words, a delivery object that supports both ad hoc support requests for information as well as large volume transactions is needed.

Examples of Known Document or Information Delivery Vehicles:

Adobe Acrobat:

One example of a presently available document delivery system is Adobe's Acrobat. Acrobat has its origin in the desktop publishing world as Adobe's electronic alternative to the printed page. Earlier, Adobe created one of the standard formats for preparing documents for printing (Postscript) and Acrobat was a natural extension of that concept. The Acrobat system allows a document to be converted in a standard format (a PDF file) that can be viewed on nearly any computer running the Acrobat Reader, without worries of having a particular display type installed or having special fonts installed. The key point to focus on is that the original document is converted. Therefore, the document is no longer in its original format. Therefore, Acrobat only provides a means to manipulate a rendering that replaces a printed piece of paper. Recent versions of Acrobat now provide some features like annotation to allow readers to "mark up" an Acrobat document. But beyond this, Acrobat files generally are static documents. One cannot edit or modify the document using the original source application that created the document and then return such to the Acrobat package. The Acrobat tools offer very limited capabilities to make additions or changes to an existing Acrobat file. In addition, the Acrobat format focuses on the document, but not on the data content presented in the document. It is difficult, if not impossible, for an automated system to extract useful information from such a document for use in another application.

Acrobat in essence emulates a printer. The user would operate in their native application, and instead of printing a hard copy paper output; they would select the Acrobat device. The system would then convert the document into an Adobe proprietary format. While this allows the document to be viewed and printed on any computer running the proprietary Adobe software, such as Acrobat Reader, it limits its use to viewing and printing. In other words, one cannot reopen the document in its native application. Most important, you cannot gain direct access to the data content of the source document. For example, if you have an Acrobat file generated from an Excel spreadsheet, all you have available to you is an electronic copy of what can be compared to a printed piece of paper. You cannot edit the spreadsheet formulas; recalculate the spreadsheet in any way. Most business documents contain a considerable amount of fundamental data. The reader of the document is interested in an easy way to extract that data. Acrobat will allow the reader to look at an electronic representation of the paper, but it does not facilitate the automation to extract that data. While Acrobat may allow different documents to be joined within a single Acrobat file, the access to the source file or application that created the document is lost. This Acrobat system is used as a document delivery vehicle and not a data delivery vehicle. It also does not support easily obtainable meta-data about the contents of an Acrobat file In addition; it does not support both data and document content.

Electronic Data Interchange (EDI):

Another existing standard for delivering information between businesses is EDI. This is an accepted standard method of delivering a common type of transaction such as invoice information between businesses. The largest shortcoming of EDI is that it is limited to only data. Documents, images, or other object types are not supported. Further a collection of different object types may not be created within a single EDI transaction. Therefore, its use is very limited and it cannot support environments where complex business transactions, or end-user requests are required.

ZIP Files:

An example of a packaging technique is a ZIP file. While this type of file may contain many different object types, including an EDI, Word, Acrobat, image, or any other type of file, it lacks a means to support automation. It may also be delivered using virtually any electronic delivery method. While new ZIP viewers will permit a file to be individually selected and permit it to launch the native application that created it, the basic nature of a zip file does not include a standard method or set of rules by which these objects are inserted into the ZIP file. Again, meta-data about the contents of a ZIP file is not easily obtainable, and therefore, prohibits automation. Therefore, while a ZIP file may be used as a container that may be delivered between business partners, they require specific rules to be first created by the business partners in order to permit automation. In almost all cases, true automation is not possible due to this lack of standards.

Email:

While email allows for multiple attachments, permits the recipient to open the file using the native application that created it, email suffers from several shortcomings. First, like ZIP, there are no specific rules in place as to how the attachments are added. Therefore, automation is not possible unless very specific rules are developed between specific business partners. Next, meta-data about the contents are not easily obtainable in a consistent fashion. Further prohibiting automation. Next, the sequence in which attachments are added and processed will affect their ability to be automated. In addition, the attachments are provided as individual files, and therefore, if the email must be processed by an outside system, there lacks an efficient method to keep the attachments together for further downstream processing.

HTML:

While standard browsers are available for viewing HTML, their lacks a means to have a collection of objects are contained within a single file. As a result, individual files must be separately provided on disk in a specific sequence to work. Further, automation is not easily facilitated due to the flexibility of HTML. The example of HTML's flexibility is the fact that all Internet Web sites use HTML as a basis for the design of their Web site. However, all Web sites look different. Therefore, business partners must again mutually agree on the HTML content and the relevant file location in order to automate transactions using HTML. Again, meta-data about the content is not easily extracted in a consistent format, further prohibiting automation.

XML:

XML represents the closest application of a universal delivery format. It may contain multiple objects of different types, has rules to define content and data elements, can contain Meta-data and can be used to facilitate automation. However, there lacks a standard browser to interact with an XML file, nor is there a standard packaging method to deliver a complete XML package. Therefore, while XML holds promise, and our tools and technologies use XML extensively, it lacks a delivery vehicle that may be employed in wide spread use.

As illustrated above, while there are many pieces of the required technology, there currently is a lack of a combination of these technologies to provide a delivery vehicle submitted. Accordingly, a system is needed to meet the requirements of a different set of business tasks: those of document imaging, conversion of paper documents to electronic format while retaining data content, work flow, sharing complex files, and EDI. To meet these requirements, such a system must be designed with a different focus and with different features than any system presently available. The needed system must expand the capabilities of presently available systems for the electronic delivery of documents and related information.

Additionally, the new system should allow documents to be kept in their native format. For example, one should be able to take an Excel document out of the delivery system, open it in Excel, make changes, and put the changed document back into the delivery system. The system could also provide for the direct viewing and display of many standard formats to further simplify user interaction. Additionally, there is a need for a document delivery system that can support dynamic, changing documents, and include end-user tools to allow for easy additions and changes.

SUMMARY OF THE INVENTION

It is therefore an objective of the present invention to minimize the manual labor-intensive data capture from paper documents.

It is yet another objective of the present invention to use a standard encoding approach that enhances existing computer generated paper documents by including a machine readable symbol at the time in which they are printed, thereby permitting the data content of the paper to be easily extracted in both human readable and machine readable form.

It is further another objective of the present invention, to use a standard encoding approach to provide an intermediate enhancement for computer generated paper documents, or any other paper document, that cannot have a machine readable symbol included at the time of printing, whereby either the data source used to generate the computer generated paper document, or any other data source for either computer generated or other documents, containing similar relevant data may be used to separately create a machine readable symbol that may then be affixed to the paper document, or a separator sheet which may precede the paper document.

It is still another objective of the present invention to use a standard encoding approach to provide an intermediate enhancement for computer generated or preprinted forms that do NOT contain index data, to provide placeholders for index data that may be added at a later date. In such a case, a machine-readable symbol would describe the location and any other relevant information such as field types, lengths, etc. to a system such as an OCR forms processing system. Thereby improving the results of such an OCR forms processing system and eliminating the need to previously train such an OCR forms processing system with a form prior to it being able to process it.

It is therefore another objective of the present invention, to include in the machine-readable symbol, additional information that may not or is desirable not to include on the paper document in human readable form. This may include, without limitation and by way of example only, processing information, document generation specific information such as the source application, version number, etc. In addition, workflow related information and non-printable information such as that represented in a logo might be included in the symbol.

It is yet another objective of the present invention to include within the machine-readable symbol, information that may be specific to group a set of related documents together. For example, the individual pages of a multi-page document, and related form sets, such as and not limited to mortgage, health care and legal documents. For example in the case of a mortgage document, a note, deed of trust, title policy amongst others may be related through common information shared in the machine readable symbol that is associated with each document within the set of documents.

It is another objective of the present invention to use machine-readable symbols generally to give use to the functions described herein irrespective of the actual type of code used (i.e. one-dimensional or two dimensional).

It is a further objective of the present invention to in many cases eliminate the need for optical character recognition to determine information about documents, and to use a machine readable symbol that may be generated at the time when a symbol is applied or associated post print.

Further, it is an objective of the present invention to provide additional information in the graphical code to, in the event that OCR forms type processing is used, assist the OCR forms processing and simplify data extraction.

It is yet another objective of the present invention to provide a standard encoding and conversion method to provide a means for converting a paper based document into an electronic form (through the use of for example a scanner) while also extracting the index data from the machine-readable symbol. The resulting electronic package file would then contain an image of the paper document and the index data in a form that permits easy extraction and transfer to another system.

A further objective of the present invention is to permit scanned documents, regardless of the availability of relevant index data to be added to the standard electronic package.

Another objective of the present invention is to provide an electronic file packaging method that permits virtually any electronic file to be contained within the packaging method.

Yet another objective of the present invention is to provide meta-data (information about the information contained within the package) about each element within the electronic package file.

Another objective of the present invention is to permit additional amounts of relevant index information may be contained within the electronic "container."

Yet another objective of the present invention is to permit the automated processing of the contents of the package using computer and other applications that have been designed to interact with the packaging.

Another objective of the present invention is that the contents of the package will be stored unchanged from their original format (other than to use compression methods to minimize the overall size of the package), in order to allow the original native application that created the object to again be used to interact and manipulate the object.

Another objective of the present invention is to secure the contents using encryption and decryption methods that allow the package to be transmitted electronically, or on computer media, thereby prohibiting the unauthorized viewing of the content, without a properly authorized decryption key.

Another objective of the present invention is to provide general information about the package in an unsecured portion of the package to permit basic processing to occur without acting upon the secured portion of the package.

Another objective of the present invention is to provide a component to the package that may contain audit, billing, tracking and other information that may be in its own separate portion of the package, which may or may not be secured.

Another objective of the present invention is to provide a consistent programmatic interface to permit interaction with all portions of the package, permit viewing, launching host applications, editing of data, and security.

Another objective of the present invention is to provide a standard end user application to provide basic and other interaction with the package. This may include and is not limited to, security access, edit, view, extraction, processing, and delivery of contents.

Another objective of the present invention is to provide a delivery, storage, archive and query system to gain access to the packages via and not limited to, email, Internet, Web server, FTP, electronic media or other applications.

It is a further objective of the present invention to provide standard structures for use between businesses or end users, such as a template, that allows a particular package to have the same characteristics for use with in a similar purpose or industry.

It is a further objective of the present invention to allow workflow or other characteristics to be encapsulated within the package. This is such as and not limited to, embedded applications, or code that may be run within the package to provide workflow or other data or file manipulation, rules enforcement, and delivery options based on rules executed within the package.

It is a further objective of the present invention to be able to display documents, and information about the documents being displayed in a viewer.

It is still another objective of the present invention to allow for the manipulation of documents that are assembled in an electronic package in the application in which the documents were created.

It is yet another objective of the present invention to be able to sort documents based upon information contained in the documents without having to resort to OCR.

In accordance with the above objectives, the present invention provides a system for transmitting and delivering documents and related information in electronic form. For purposes of this application, this is referred to as an electronic package or electronic container. The present invention provides the flexibility of viewing, editing, summary analysis and other options associated with documents and the information contained therein. The present invention provides a standardized electronic "container" for delivering information such as documents, data and images via email, the Internet or on electronic media. The present invention provides a delivery method for supplying customers and business partners alike with instant information they need. Another objective of the present invention is to provide a delivery mechanism for both ad hoc support as well as large volume transactions.

In accordance with one embodiment, the system of the present invention is XML based, but with specific rules for creation of the electronic containers, thus allowing the containers to be disassembled for simple extraction of its contents. By using specific rules for the creation of the present invention document delivery system, applications may be developed to interact with the system, such as standard viewers. According to an embodiment of the present invention applications may be developed to allow automated processing of delivered documents on a large scale, such as importing the information contained within the delivery system into other systems such as data, imaging and workflow systems.

In accordance with another embodiment, the delivery system of the present invention holds data, documents, and images, as well as files such as Word, Access, Lotus, or even an EDI transaction. The possibilities for the contents of electronic containers of the present invention are virtually limitless. These files and other objects may include specific index information to allow them to be more readily identified to the user. Documents may be grouped and organized in a fashion that best suits the needs of the sender or recipient. Therefore, rather than, for example, having a list of 100 TIFF images displayed for which the recipient must determine the significance, the document delivery system of the present invention will allow the identification of the documents as a note, deed of trust, insurance claim or legal case file by sorting information that is represented in a barcode symbol that can be read in a machine readable fashion. This eliminates the user from having to deal with information that is not relevant, such as a TIFF image, freeing the user to deal with issues that are important, such as the terms of a note, claim or case. Further through the use of templates, documents may be organized where regardless of the point in time the object is added to the package, that the object will be presented in a consistent fashion.

In an embodiment of the present invention, the contents of the document delivery system remain in their original format. A Word® document remains as a Word® document, thereby allowing such documents to be used by the recipient in their native mode. An image remains an image, and an Excel® spreadsheet remains a spreadsheet.

In some cases, the sender may not wish the recipient to edit particular contents. Therefore, through the use of various security levels, the recipient may be limited to only viewing the contents.

In an embodiment of the present invention, all components of the business transaction are kept together. Today, businesses are forced to deal with and accept information that is split into different pieces that cannot be easily kept together. For example, some information may be provided on a disk that contains a database. Other information is provided in a stack of paper and even other information provided on disk such as Word, Excel or EDI files. The document delivery system of the present invention simplifies this process significantly as all of these individual components may be contained within a single package, thereby providing ALL the information within a single container. By "gluing" all of the elements together, the components will not be split up and lost and will always be available. Therefore, for example, a single package of the document delivery system of the present invention can easily contain a complete loan file, legal case file or patient file.

When an electronic or "virtual" package is created in accordance with the document delivery system of the present invention, the package or container includes a unique identifier, allowing for automated processing. In addition, it may also be encrypted. If the recipient does not have the proper decryption key loaded in their receiving software or viewer, they will not be able to display or process the contents of the package. In addition, multiple levels of security are provided for each element contained in the package or container. Therefore, the recipient may be able to edit some fields, and not others. In addition, information may be prohibited from extraction. The document delivery system of the present invention includes security levels that are quite flexible.

One of the significant advantages of the document delivery system of the present invention is the virtual package viewer. This allows anyone who receives a package or container to easily view its contents. By using the document delivery system of the present invention, the sender no longer needs to worry about dealing with the technical or customer support issues of the information being sent. Rather, the provider of the document delivery system of the present invention will support all of the questions and issues in dealing with and interacting with the document delivery system of the present invention. The sender will still need to ensure that the correct information is in the package. However, once sent, the sender no longer no longer needs to deal with the support issues that currently force users to accept other existing technologies.

Other characteristics of the present invention will become apparent from a review of the detailed description of the invention that follows.

DETAILED DESCRIPTION OF THE INVENTION

As noted above, the present invention is a system and method for creation of an electronic container that comprises a plurality of documents and meta information about the documents. A graphical code is used to assist in extracting information about the documents in the electronic container.

The Invention can essentially be broken into a number of major components.

a) XWPL—eXtensible Workflow Package Language is an eXtensible Markup Language (XML) based language. One portion of the language defines a standardized method to place information into a machine-readable symbol such as a high-density barcode. The actual symbology used is flexible. Any symbol simply needs to be able to support enough characters of information to be useful. In the event that the data content exceeds the capacity of the symbol, a different symbol may be employed. For example, a 2-D barcode such as a PDF-417 has a limitation of about 2500 characters of information compressed, in the event that this capacity is exceeded, a replacement such as Xerox's Data Glif may be used.

Another factor that impacts the use of a particular symbol is the license cost for the symbol generation and recognition. Therefore, through the use XWPL, the selection of the symbology is minimized as the language provides a consistent structure for information. A significant feature of XWPL is that it does not deviate regardless of the symbology employed. Therefore, though using XWPL, structured applications may be created and employed to create and extract information from the symbol for processing. This allows for the creation of a smart document that is both human readable (the paper document itself) and machine readable (through the use of an XWPL based symbol). When possible, the machine-readable symbol may be included on a computer-generated form at the time in which it is printed. In other cases, a symbol may be generated externally and applied to the document using a label, or a separator sheet, which may be associated with the paper document. A data source may be used for the creation of the XWPL based symbol, or any host of other applications may be employed to permit other systems or even direct user input for the information. For preprinted forms that do not contain all of the necessary index information, again a machine readable symbol may be later created and associated with the document. In other cases for preprinted forms, a machine readable symbol may be included on a preprinted form to identify the form, and location information (specific geometric information to locate a particular index field) to instruct a system such as an OCR forms processing system where to extract pertinent information. Additional information such as workflow related information might also be incorporated in the symbol, as well as other information that is not printed on the form, such as the person or system that originated the document, and other information that is not required or not desired to be printed on the document in human readable form. Lastly, XWPL symbols may be employed in any industry where documents carry index information that is useful for a downstream recipient.

b) The electronic container—The second component of the system is a standardized electronic container Virtual Package ("Virpack"), which is an electronic file that may be used to store any type of object such as an image, document, database, or any computer generated file including word processing, database, EDI or any other type of file. It may also be construed to be a stand-alone workflow envelope or container. In an embodiment of the present invention, that documents stored within the VirPack are retained in the original format in which they are created. Therefore, the recipient of a VirPack can manipulate an object contained within a VirPack using the same application (such as MS-Word) that the sender used to create the object. If the user so desires, applications may however, be created to convert documents into other formats such as converting a MS-Word document into an Adobe Acrobat (PDF file) prior to the document being added to the VirPack. Further, specific (unlimited) index information may be created and stored that is specifically associated with a particular object.

Both the index data itself and unique field level properties may be defined and identified. Therefore, not only for example is a name provided, but also the characteristics of the field in which the name resides is also identified, i.e. that the field is 32 characters long. Therefore, information such as identifying the author of the object, date, workflow or other information may be associated with the particular document.

The contents of a VirPack may be either unstructured or structured. Therefore, based on user requirements, the VirPack content or structure may be designed to meet specific needs. For a structured VirPack, which are more easily automated, the concept of Templates is employed. A Template can define the contents of a particular VirPack. Not only the placement of the document (hierarchy) may be specified, but index information for each object as well. Further, a VirPack can contain additional index information unique to the overall package. For example, a VirPack may be defined to list and contain particular documents for a loan, as in a mortgage application. Each document may also be placed into a subfolder to meet specific grouping needs. All of the legal documents may be placed in a Legal Subfolder, Title Policy documents in a Title Subfolder, etc. The number and construct of the hierarchy in unlimited and only constrained by the practical size of the overall VirPack. However, as technology and delivery methods improve, the overall typically acceptable size of a VirPack will grow.

Each document can also be placed in a specific order, thereby allowing the user regardless of when a document is added to the VirPack, to know where to expect to locate the particular document in the hierarchical tree of the VirPack. This feature also promotes automation as the Template allows downstream systems or applications to anticipate the structure of the VirPack, its contents and index information, thereby allowing unique application to be designed to process or interact with VirPack.

Each document within a VirPack may contain unique index information for the particular document. In addition, information for the overall loan may be provided in a separate portion of the VirPack. This supplemental data may then be used by a user or system to enhance or automate the overall processing of the entire VirPack. Again, this supplemental data cannot only be provided to indicate the field value, but the characteristics such as field name (fname), its type (character) and value (length of 32).

VirPack also provides for basic rules to enforce or identify the completeness of a VirPack. Therefore, if a particular document or index field is missing, the VirPack can identify itself as incomplete. Further, VirPack provides mechanisms to permit components such as Java Script, VB Script, other such utilities, applications or executable components to be executed from within the VirPack. Therefore, rules, workflow specific information or other information may be captured or manipulated from within the VirPack. For instances where static data is not sufficient, additional functionality may be provided. For example, based on a particular index field entry, a script may be launched that determines another action that may be required by the user, or as part of workflow automation. For example, a user or system may enter an index field value that then causes a script to be executed, such as the total amount of an expense report. In the event that the value exceeds a predetermined level, the VirPack may notify the system or user that the VirPack should be delivered to another party for further approval or that additional information is required.

Each variation of VirPack carries with it a unique identifier, allowing for automation. Further, additional rules may be incorporated within the VirPack to determine the level of interaction permitted by the sender. The sender may restrict or open the interaction to an individual index, component of object level. Therefore, certain entities or objects within a VirPack may be restricted to be only viewable, editable, exportable or printable or any combination thereof.

The VirPack also has the ability to automatically launch a rendering or editing tool form within the VirPack. If, for example, an MS-Word document is contained within a VirPack, if selected the VirPack can be designed to permit MS-Word or another Viewer to be launched to View or manipulate the document. In a typical MS-Windows environment, a VirPack based application would launch the registered application for the particular file type.

Further security components may be incorporated in a VirPack for encryption and decryption. Therefore, a VirPack could be constructed using available methods such as Public Key Encryption, DES encryption or other methods to secure a VirPack to prevent it from being accessed by an unintended party. Further this security can be implemented to a level by which each component of a VirPack can be individually encrypted using different methods. However, most uses find this extreme level of encryption unnecessary.

Another component of VirPack is an audit or accounting module. This portion of the VirPack could contain and is not limited to such accounting information such as billing information, the number of objects contained within the VirPack, individual object file size or page count information, originating party information, recipient information or other such information which could be used to track and account for the utilization of the VirPack. This accounting type portion of the VirPack could or could not be separately encrypted. However, methods could be employed to use the content information of the other components within the VirPack to ensure that this accounting portion of the VirPack is not removed or replaced with fraudulent information.

Another feature of VirPack is to provide tracking of revisions. Each time an index field value is modified, the preceding value may be stored to provide a history of the index information. Further, VirPack could be configured in a manner in which each time index information is revised, that the changing party (or other desired index information) be identified prior to committing the change. In some case, individual objects stored within a VirPack when launched and manipulated and then saved as a revision, features could be implemented that requires that the document be reinserted as a new object or that the modification be annotated. Typically, the original source documents are always retained within the VirPack, and any modified documents are reinserted as a new object.

Due to the structured nature of VirPack, any assortment of application could be designed to create, manipulate or interact with a VirPack. Lastly, VirPack may be employed in any industry where it is desirable to provide or deliver single, multiple or complex objects within a single package in conjunction index information to support information delivery, customer service, enduser delivery, automation or downstream viewing, manipulation, extraction or processing.

c) VirPackPrep/VirPack Viewer—As XWPL provides a standard set of rules in which to create machine-readable symbols and VirPack, any number of applications may be created using these rules as a guideline. Therefore, as part of the present invention, a number of applications have been developed to provide end-user interaction for the creation, manipulation and delivery of VirPack. A component of the overall VirPack system is the VirPack Viewer and VirPackPrep. The basic distinction between VirPackPrep and VirPack Viewer is their capability to manipulate VirPack. Depending upon the security levels implemented within the VirPack itself, the user may in the case of VirPack Viewer or VirPackPrep, be required to install a decryption component to view the VirPack. Additionally, the security levels implemented on each component within the VirPack will be enforced. In either case, if the necessary security protocols are installed, the user may select a VirPack to open. The user will then be presented with a directory listing of the contents of the VirPack in a hierarchical fashion. The user may then select individual objects within the VirPack to interact with. The user may or may not be permitted to view, edit, print or extract individual objects, documents or index elements, based on security protocols. If the user selects an object for viewing, the application will determine the necessary application required to render the object (typically using the MS-Windows operating system relationship) and launch the application. In other cases, an internal rendering tool may be incorporated within either VirPack Viewer or VirPackPrep to limit the user to only viewing or printing the object. In the event that index information or other components are edited, the user will be prompted to save their changes prior to exiting the application. In addition, the user may save changes as the user manipulates the VirPack.

In the event that Java, VB Script of other such tools are employed, the user may be prompted for information regardless of whether any existing index information has been changed. As part of both applications, the user may be permitted to save the VirPack to a local or network system. In addition, email facilities are incorporated within both products to allow the VirPack (as long as the necessary email requirements are met) to be emailed to another party.

The VirPack Viewer is restricted to where it prohibits the user from adding new objects such as files, images, etc. to the VirPack. However, the user may be permitted to edit data content, print, view and externally save objects.

VirPackPrep permits the user to scan documents, which may be added to the VirPack, in addition to selecting file objects from their system to also be added to the VirPack. Further, VirPackPrep supports Templates, which allows the user to define and save unique structures for VirPack creation to meet their needs. The VirPackPrep user could open an existing VirPack and add new objects to it, or select a Template, which would then allow them to create a new VirPack that conforms to a specified construction.

As previously mentioned, Templates are more suitable for automating the receipt of a VirPack. However, the user is also permitted in VirPackPrep to create a VirPack without the need of a Template. Further, the Template builder is a separate component of VirPackPrep, which may be delivered as a module of the application.

VirPackPrep will also accept an ODBC data source as a means to create VirPack with supplemental index data when used in conjunction with a Template. The user may then individually select a row of information, and create a VirPack where the index information will be transferred to the proper location in the supplemental index information, to which they may then add additional documents or objects. Further, in conjunction with the Template and supplemental data (supplemental data however, is not required), the user may generate labels or separator sheets containing XWPL symbols. These symbols may be used for simple inventory and document control functions, in conjunction with a symbol reader such as a barcode wand for data capture, or as a means to scan the document in conjunction with the XWPL symbol to automatically place the document within the current or other VirPack.

When used in conjunction with VirPackPrep, the user may accept a multiple row data source, which may then be used to generate multiple XWPL symbols (one symbol for each document and row in the data source) for each document to be scanned. The user would then prepare the documents with the XWPL symbol in the proper sequence to permit scanning. Again using VirPackPrep, the user could then scan the documents, and the application would then, using the necessary symbol recognition tools, extract the data from the symbol, and automatically place the image of the document within the correct VirPack in the correct placement within the hierarchical tree.

d) Process Manager—The Process Manager is another component of the overall VirPack system. Where VirPackPrep and VirPack Viewer are designed for the individual or batch manipulation of VirPack by an end-user, the Process Manager is an application designed to be integrated with Imaging, Workflow, Document Management and other data systems. In creating VirPack, the Process Manager accepts data from a data source (in batch or real time fashion), which then instructs the Process Manager to query and retrieve objects from for example, an imaging, document management or workflow system. The Process Manager then creates a VirPack for the particular result and delivers it to a previously determined location. This could be on a file system, web site location or delivery via email.

The Process Manager also accepts data, for which XWPL symbols are generated. These symbols would be prepared with the necessary documents. The documents could then be scanned, the XWPL symbols recognized by the system and VirPack automatically created and again delivered. In an import mode, the Process Manager could be instructed to process VirPack located on a particular file system or receive VirPack via email, then according to predefined rules, extract the necessary index information to determine how to further process the VirPack. Index data and objects could be extracted from the VirPack for import into an imaging, document management, workflow or other system. The Process Manager may be configured to process VirPack to and from a number of sources and deliver or import VirPack to or from the correct system.

In addition to the above functions, the Process Manager contains scheduling capabilities to permit it to run in an automated server type fashion, or to require user interaction to begin or end a process. Further, the Process Manager, as part of storing VirPack on a file system or removable media such as CD-ROM, could be instructed to extract any number of index fields from the VirPack for storage in an external data file. This data file could then be queried by a user to locate a particular VirPack of interest. An application could be created to allow the user to query this data file, and retrieve the correct VirPack for viewing or further manipulation.

e) VirPackCatalog—Another example of an XWPL and VirPack based application is VirPackCatalog. In the event that a user begins to accumulate VirPack, a need will arise to provide the user with a means to quickly locate VirPack at a later time. As discussed in the Process Manager, as the Process Manager creates VirPack, a subset of index information could be extracted and stored in an external database. This database may be also stored on an individual CD-ROM to describe the listing of VirPack contained on the CD-ROM. Further; in a larger system this external data source could encompass the total accumulation of VirPack on a system. Regardless, VirPackCatalog could utilize the data source to allow the user to query the system to locate a particular VirPack, which would then be displayed for manipulation. In the event that an external data source is not available, VirPackCatalog could process each individual VirPack and extract the necessary index information, which would be stored in an external database, to improve the efficiency of returning the results of a query. In the case of VirPack stored on removable media such as CD-ROM, VirPackCatalog could extract information from the external data source located on the CD-ROM or again process each individual VirPack to extract the necessary index information to perform the necessary query. In a removable media implementation, the user upon the completion of a query could be prompted to insert the correct media into a drive for subsequent retrieval of the correct VirPack, or further systems could be implemented to allow for automated retrieval through the use of for example, a CD-ROM jukebox. The purpose of VirPackCatalog is to provide a user who is accumulating VirPack, a means to query a system and retrieve VirPack upon demand.

f) XWPL Based tools—Using XWPL as a guideline, various computer software applications may be created to permit interaction with machine readable symbols that contain XWPL information, in addition to VirPack. A number of these applications have already been created as illustrated above. However, the number of existing application is not intended to reflect the entire capability of XWPL and VirPack. As XWPL is a generalized programming tool, full Applications Programmer Interfaces may be developed which would permit integration into virtually any new or existing computer application.

g) VirPack Delivery System—Since VirPack is an electronic file, it may be delivered or stored in any number of fashions. As such, another component of the present invention is a number of VirPack related services that may be provided using VirPack as an information delivery vehicle. For example
  a. A user or system may create VirPacks, which then need to be delivered via the Internet. A component of the present invention is a method by which VirPack are delivered via email, FTP or posting to a web site. This is an implementation as demonstrated by the VirPackCourier system.
  b. A user may desire to accumulate VirPacks as a means to automate, provide improved centralized storage of electronic information, a means to eliminate paper of other reasons. The user could then delivery to an intermediate part VirPack to be accumulated and stored on removable media such as CD-ROM. At the end of a given period of time, or on a scheduled basis, this media containing VirPack could be delivered to the customer for their use. In such an environment, an application such as the Process Manager could receive and process VirPack for Storage on removable or other media. This example is demonstrated by the VirPackCD system.

c. A user may desire to accumulate VirPacks as a means to automate, to provide improved centralized storage of electronic information, to eliminate paper or for other reasons. The user could then deliver a partially completed VirPack to be accumulated and stored on removable media such as CD-ROM. At the end of a given period of time, or on a scheduled basis, this media containing the VirPack could be delivered to the customer for their use. In such an environment, an application, such as but not limited to, the Process Manager could receive and process VirPack for Storage on removable or other media. This example is demonstrated by the VirPackCD system.

Examples of XWPL and VirPack in a Process

Following are a number of examples of the use of XWPL and VirPack technologies. This is a representative example and is not to be construed as a complete or limited to the examples below.

XWPL symbol as Incorporated in a Computer Generated Document at the Time of Print.

a) An existing computer application can be enhanced to incorporate the means to generate and include an XWPL symbol on a document at the time of print.

b) When the document is generated, any relevant index data, as well as any other specified information might be included in the symbol. This may include yet is not limited to
     a. The field name
     b. The characteristics of the field such as the type (character or numeric) and the width or precision (number of characters, or precision in the case of a number)
     c. The coordinate location of the index field as it is printed on the document.
     d. Workflow processing information
     e. Mathematical information such as the quantity times the unit cost should equal the extended cost for an item line. Further the individual line items may be totaled.
     f. Return information to process the document in the event that the document is returned to the originator.
     g. Any other type of information defined within the application    c) The XWPL symbol may then be used as an alternative means of extracting the required information using an application in conjunction with a symbol-reading device such as a barcode wand. Or the document may be scanned and automatically processed by a system such as an imaging, document management, workflow or other data system using the information contained within the XWPL symbol. Further, the XWPL symbol may be employed by an application such as VirPack-Prep to create a VirPack and to either deliver or store the VirPack as previously defined.

XWPL Symbol Generated on a Label or Separator Sheet, in the Event that an Application Cannot Be Modified to Include the Symbol on a Document at the Time of Print.

a) In the event that an XWPL symbol cannot be incorporated as part of the document at the time of print, an application could be designed to obtain data from the source application (the application which generated the document), or to have a user manually enter the necessary index information.
     a. The application would then generate an XWPL symbol, which may be printed on a label or separator sheet. This symbol may then be affixed of associated with the document in a preparation process.

b) The ultimate use of the XWPL symbol can also be illustrated as previously discussed above.

XWPL Symbol when Employed on a Preprinted Form that does not Contain Specific Index Information.

a) As previously described, an XWPL symbol could describe all characteristics of index information on a form. However, in the case of a preprinted form, the unique index information itself is missing. Even so, an XWPL symbol may be employed to enhance the document. As the XWPL symbol could describe the field level characteristics, it can assist for example and OCR forms processing system as to where to locate index information that may have been added at a later date, as well as any rules or workflow information to further assist processing.

VirPack Processing in a Loan Application a) A VirPack template is created to identify all of the necessary documents and index fields required to process a loan.

b) A user receives a VirPack, of selects the Template to create a new VirPack. The user then fills out the data elements required for a loan application. Any application documents such as pay stubs, W-2, credit information, or other required documents may be scanned or electronically inserted. In the event that rules are in effect, the user may be prevented from delivering an incomplete application to the bank that may be missing a required object.

c) The VirPack is delivered via email, FTP or other electronic method, to the bank.

d) The Bank automatically extracts the loan application information from the VirPack and uploads it to their Underwriting system. The VirPack could be uploaded to a Workflow system, or individually manipulated. An Underwriter reviews the contents of the VirPack for the necessary required documents. The Underwriter based on their decision, could add documents in which the applicant must respond, or simply approve the loan.

e) The VirPack can then be passed to a closing system, which then delivers a copy of a VirPack to any individual party who may need to perform work to properly complete the loan.

f) Once the loan process is complete, a Loan Origination system could rather than generate a paper set of closing documents, insert electronic files in the VirPack.

g) The VirPack then gets delivered to the loan-closing agent who may then review the documents for accuracy, and print them.

h) The documents are then executed, and the paper documents are scanned back into the VirPack for delivery to the bank for Audit. The paper documents can then travel directly to custody or be archived.

i) Once the contents have passed audit, a copy of the loan may be forwarded to a servicing agent who will service the loan.

j) The service agent then extracts the data from the VirPack to upload into their servicing system, and reviews the remainder of the VirPack for completeness. The loan can then complete servicing.

k) In the event that the loan is sold, a copy of the VirPack may be delivered for processing the necessary assignment documentation.

l) In preparation of the loan satisfying, the VirPack may be delivered to a user who must prepare the necessary documents to meet the satisfaction requirements. Using the data in the VirPack, the user may sort the loans in priority in which they need to be processed, in order to ensure timely completion of processing.

m) IN the event that the loan is sold into the secondary market, a VirPack may be delivered to the secondary market purchaser, who may then review the entire contents of the VirPack for accuracy and completeness, and extract the necessary index data for upload into their loan processing system.

VirPack Used as a Customer Delivery Vehicle in Conjunction with an Imaging System.

a) An end user application could be created, or a vehicle such as a Web site created to support query of a database containing information about for example a title policy. Upon receiving the expected results, in the case of an enduser application, the user may be presented with a create VirPack button. When selected the documents are retrieved from the imaging system, stored in a VirPack and the user is presented with a means to enter the requestor's email address. The VirPack is then delivered to the requestor.

b) In the event of an application such as a Web site, the user may query the system and upon receiving a result, identify which items they would like to receive and an email address is provided. A Process Manager is provided the information, upon which queries the imaging system, retrieves the documents, creates a VirPack and delivers it to a requestor.

Any documents created as a part of a VirPack, using an XWPL based symbol is essentially a smart document. This smart document comprises not only the contents of the document itself, but also information about the document, which assists the system of the present invention in logging, cataloging, and storing the document in a flexible way, such that the document and its contents, as well as information about the document can be retrieved in an automated fashion. The system of the present invention creates a Virpack, which assists with document imaging and workflow. Further, it allows the sharing of complex files as well as electronic data interchange. The Virpack comprises not only a document but also a standardized "object" in the form of a graphical code that is used to transmit data and documents throughout all steps of a business process that employs the Virpack. This code carries XML data along with the documents making the data available for use by customers to extract information for use with other applications. In addition, the Virpack can also allow other information to be input by the recipient of the document, allowing the document to serve as a workflow tool.

It is important to note that when documents are added to a Virpack, the documents are kept in the format of the application that created the document. Thus, an Excel document in a Virpack still functions with the Excel program. Changes can be made to the document and the changed document can be put back in the Virpack for storage or movement to the recipient.

The Virpack contains, in electronic form, a "packing list" which notes all of the contents of the package, individual document index information which comprises information that is specific to the document or documents themselves, supplemental index information which further helps in searching and sorting information in the virtual package, and the documents or files themselves in image form which allows the actual documents to be reconstructed in hard copy should the need arise. Thus, the virtual package of the present invention allows a user to put data, documents, and images together in a single electronic package for submission of workflow management.

The virtual package of the present invention can comprise any type of file, and as noted above, each such file remains in its original format for subsequent manipulation and printing. However, the virtual package that contains the various files of information is distributed as a standard "container" and can be distributed via email, Internet, cd-rom, or indeed any medium that is normally used to transmit data and information.

The present invention also comprises a viewer that allows users to receive and view the virtual package at workstations. The viewer can easily display the underlying document, the individual document information, the packing list concerning the virtual package, and any other data that is associated with the virtual package.

Figure 1:
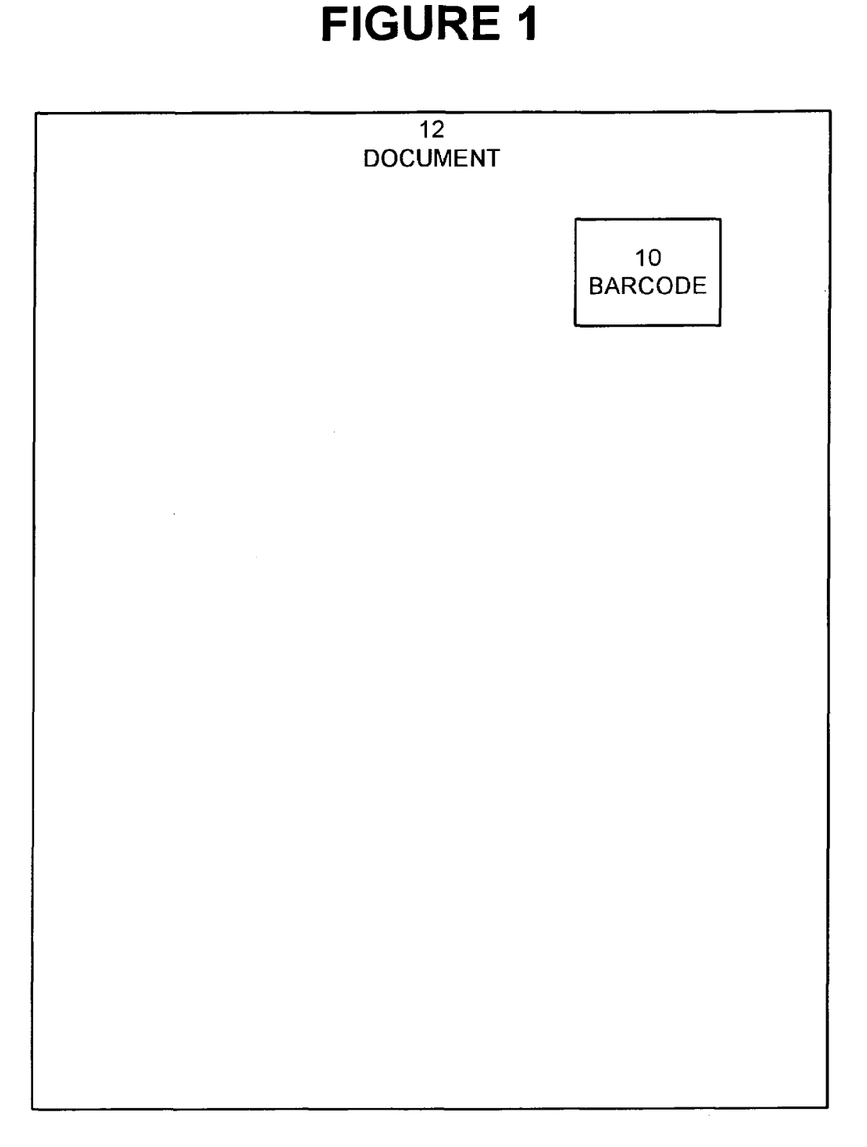
FIG. 1 illustrates a document of a VirPack have an associated barcode.

Referring to FIG. 1, an underlying document of the Virpack of the present invention is illustrated. Information about the document is contained in a barcode symbol that is created when the document is initially indexed into the system of the present invention. The barcode information 10 comprises unique information about the document. Barcode can contain unique index data for the document in question, the coordinate location of various fields that relate to the document. For example, a loan document may have an interest amount, monthly payments, address of the borrower, and other information. This information is indexed in the unique barcode, and coordinate location information concerning those fields is also stored in the barcode. Thus, a subsequent search engine can search the barcode for the appropriate information contained in the document and display that information in the viewer of the present invention.

Routing information concerning where the document should go at various steps within the workflow of the organization and for example, where the document should be delivered upon return, can also all be contained within the unique barcode of the present invention.

The barcode is imaged together with the documents so that the document can be displayed in the event that that is deemed to be useful. Thus, any document that is viewed by the viewer of the present invention will comprise not only the unique barcode 10 but also the document 12 themselves.

The high-density barcode 10 that is used with the present invention is a product of a rule-based process, which is based upon the extensible mark up language (XML). The system of the present invention uses a rulebook, which is a variation of XML known as the extensible workflow package language (XWPL). XWPL is applied to XML to allow for the creation of the virtual package of the present invention as well as the high-density barcodes. Using the XWPL to generate the high-density barcode allows for the automated indexing of the paper documents by virtue of reading the barcode that is associated with any document. Reading the barcode will allow various categories of information to be determined and allow the document to be automatically indexed based on that information.

Figure 2:
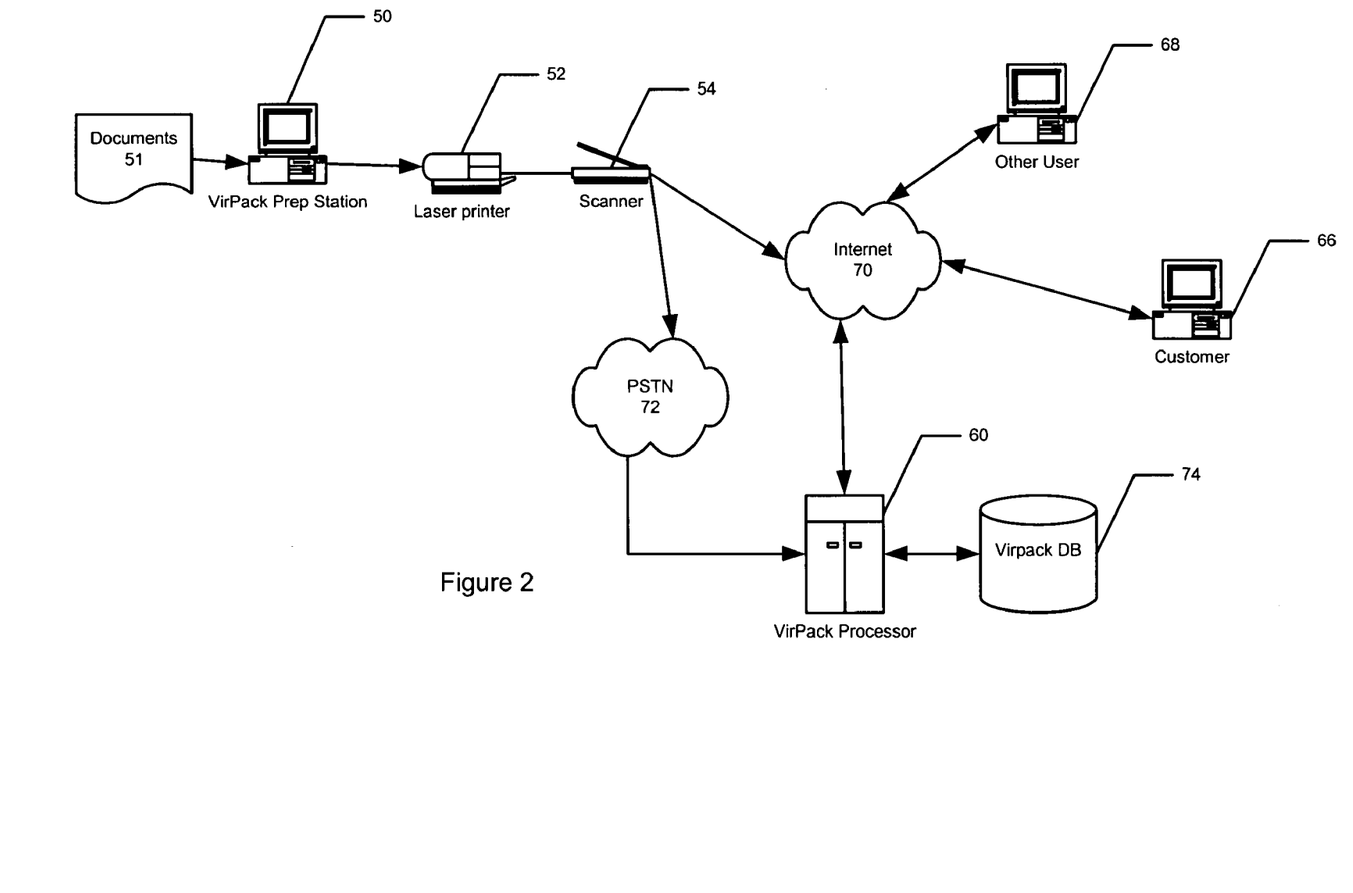
FIG. 2 illustrates the overall architecture of the present invention.

Referring to FIG. 2, the overall architecture of the present invention is illustrated. As noted earlier, the VirPack prep station 50 enters information concerning documents 51.

That information is converted via the XWPL language to a barcode symbol, which is then printed on laser printer 52. The document 51 together with the barcode is then scanned 54. It should be noted that scanner 54 could be a fax machine or a special purpose scanner. In either case, the digital stream is then sent to VirPack processor 60 where it is turned into a VirPack.

Scanner 54 can send the scanned image and barcode via Internet 70 to VirPack processor 60 or via the public switch telephone network 72 to VirPack processor 60. Either route is equivalent so long as the digital information arrives at VirPack processor 64 subsequent to processing.

After the VirPack is created, the VirPack processor sends the VirPack via the Internet 70 to the customer 66 for subsequent review and storage at the customer facility. Alternatively, and in one of the business models for entities using the system of the present invention, VirPacks can be stored locally at the VirPack processor 60 and a VirPack database 74. VirPacks stored in VirPack database 74 are then available to the customer 66 or other remote user 68 authorized by the customer to have access to the VirPack information in the VirPack database 74.

It should also be noted that the transmission of VirPack information over Internet 70 is not meant as a limitation. For example, customer 66 may also be connected to a public switch telephone network 72 which can then access VirPack information over any of the dataline options offered over the public switch telephone network such as ISDN, DSL, and others.

Figure 3:
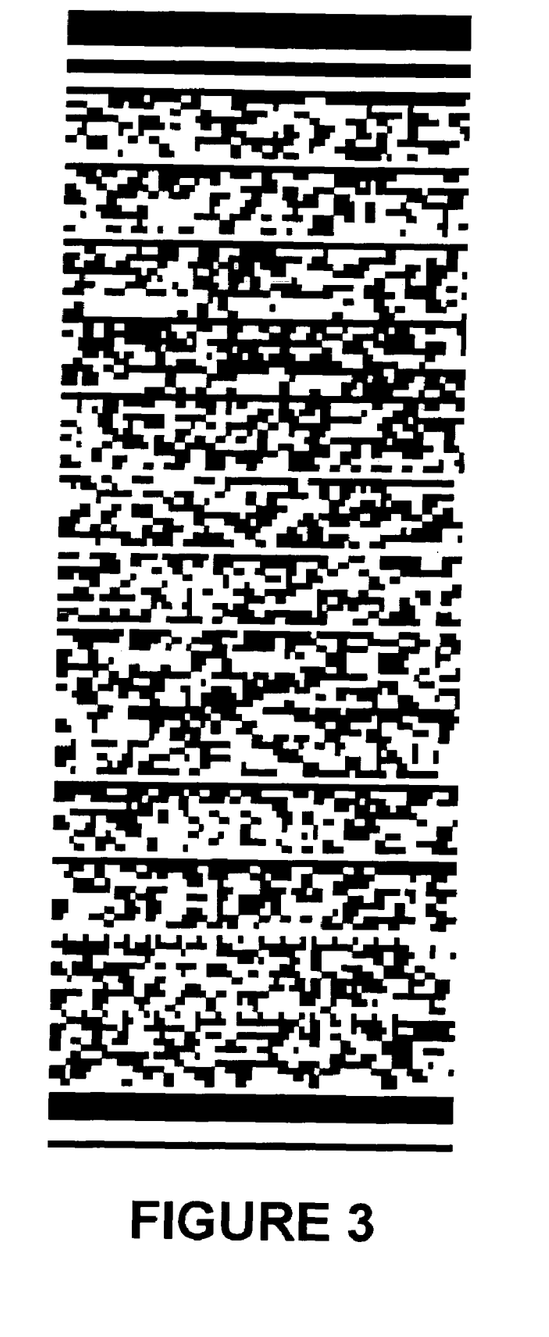
FIG. 3 illustrates the XWPL barcode of the present invention.

Referring to FIG. 3, the XWPL barcode of the present invention is illustrated. This barcode allows for human readable data to be indexed into a machine-readable format. In the present invention, this barcode (FIG. 3) identifies a document, and provides high level indexing information. Such indexing information can be specific to a document and can also be specific to an entire transaction in which the document is but one part. Further, the barcode also carries electronic data interchange (EDI) information.

When using this barcode, the need to manually re-key data that might be present on a specific document is eliminated. Further, the barcode allows documents to be associated with one another since a barcode on one document can refer to a particular transaction in which another document plays a key part. Thus, the two separate documents can be sorted and assembled together as part of the same transaction.

The barcode if the present invention is also used for inventory and tracking so that within any database or workflow system, at any point in time, the presence of the document can be noted and where it is in the workflow process can be determined.

Finally, use of the barcode in the present invention eliminates the need for subsequent scanning for optical character recognition purposes. Since information about the document is stored within the barcode, the barcode can simply be read and the need for OCR is eliminated.

Figure 4:
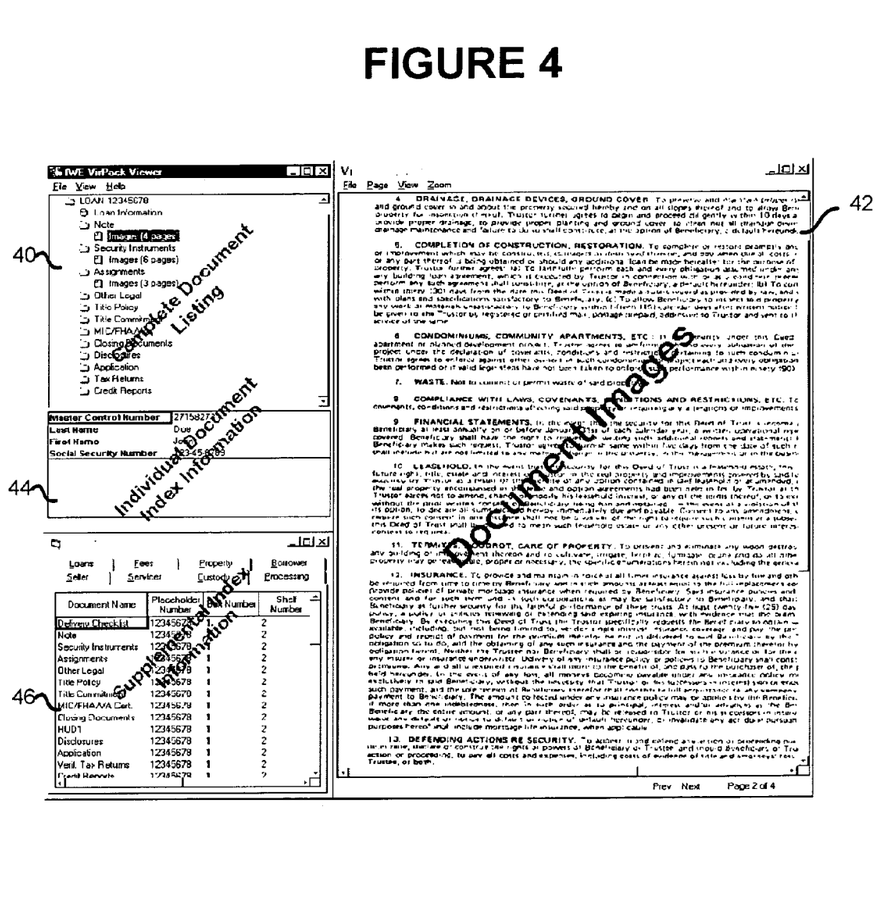
FIG. 4 illustrates the viewer of the present invention and its interaction with a virtual package of the present invention.

Referring to FIG. 4, the viewer of the present invention and its interaction with a virtual package of the present invention is illustrated. The viewer of the present invention allows the barcode symbol to be read and to extract that information that is present in the barcode. Thus, by reading the barcode, a complete listing of documents associated with the virtual package 40 is displayed. Further, when any particular document 42 is displayed, information about that document 44 is displayed as well. As noted earlier, supplemental information concerning the document an indeed the entire transaction to which the document relates is also stored on the barcode symbol. The supplemental index information can also be displayed 46 for the viewer.

Figure 5:
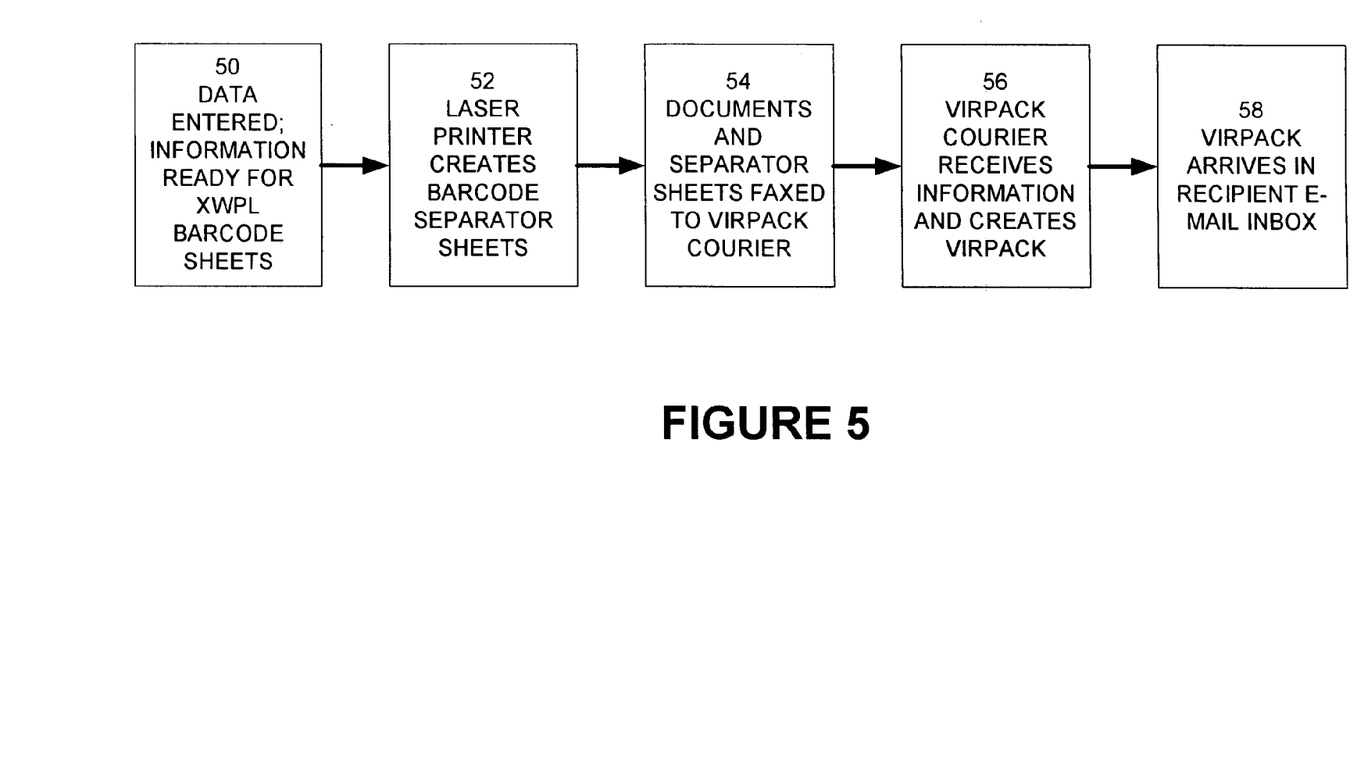
FIG. 5 illustrates the preparation activities associated with the creation of a virtual package of the present invention.

Referring to FIG. 5, the preparation activities associated with the creation of a virtual package of the present invention is illustrated. A document is reviewed and, at a workstation, information concerning the document is created. That information is then converted by the XWPL language for creation of a barcode symbol. Information on the workstation 50 is the sent to a printer 52, which creates the barcode to be applied to the document. Presently, a laser printer produces the barcode, which is applied to the document. However, this is not meant as a limitation. Other types of printers will also serve to create the necessary barcode symbols. The entire document, together with the barcode is then scanned 54. The scanned image is then turned into a Virpack 56 which, as noted above, is an electronic package containing the image, data concerning the image, and other index information. That Virpack is then stored at the server of the present invention and/or is sent to a recipient for subsequent storage, viewing, and manipulation 58.

Figure 6:
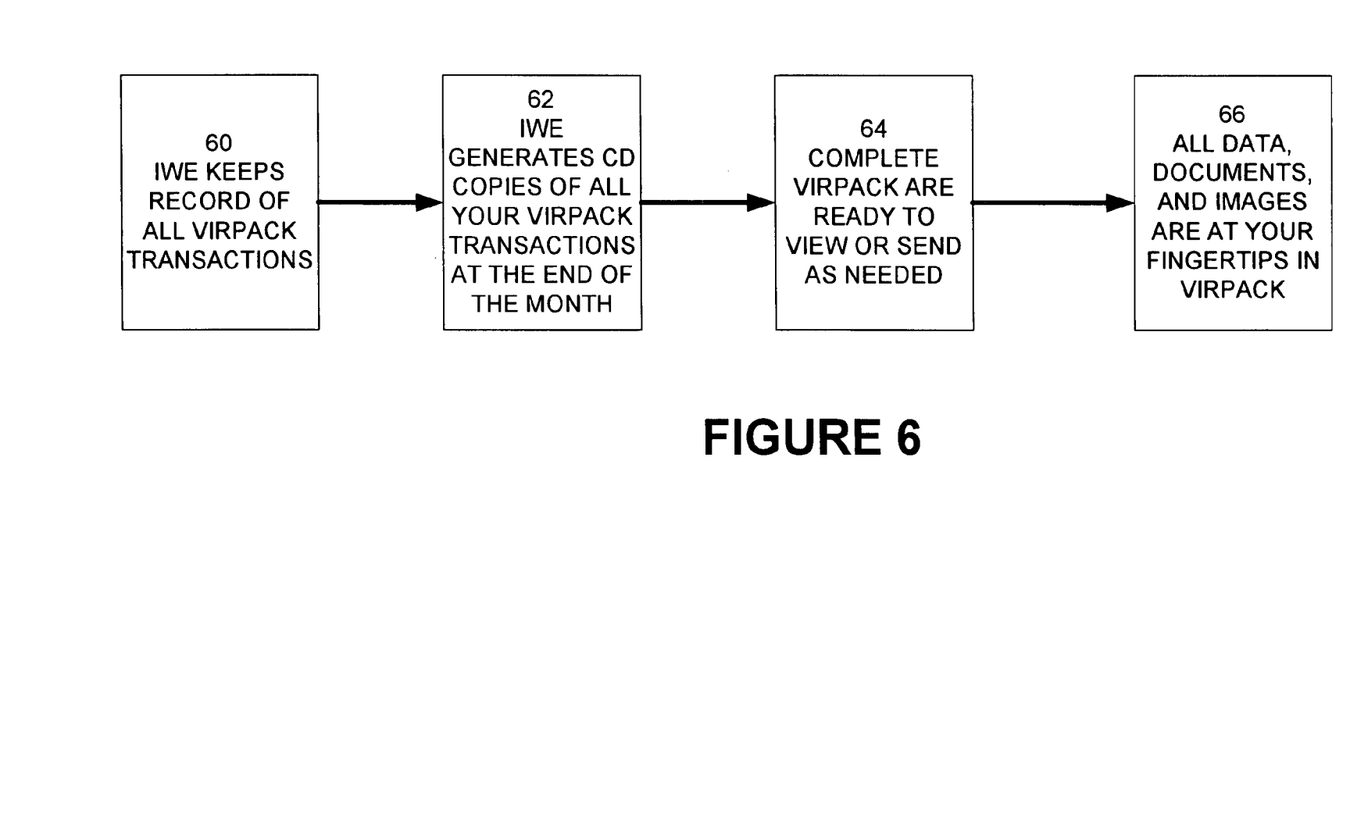
FIG. 6 illustrates the business relationship associated with Virpack management.

Referring to FIG. 6, the business relationship associated with Virpack management is illustrated. Virpack processor 60 keeps records of all Virpack transactions and stores them locally. Periodically, CDs of all Virpack transactions are generated 62. These CDs 62 can be viewed or sent as desired by the customer 64 so that all data and documents can be reviewed either at the customer facility or at the location to which the customer desires the CDs to be sent 66.

Figure 7:
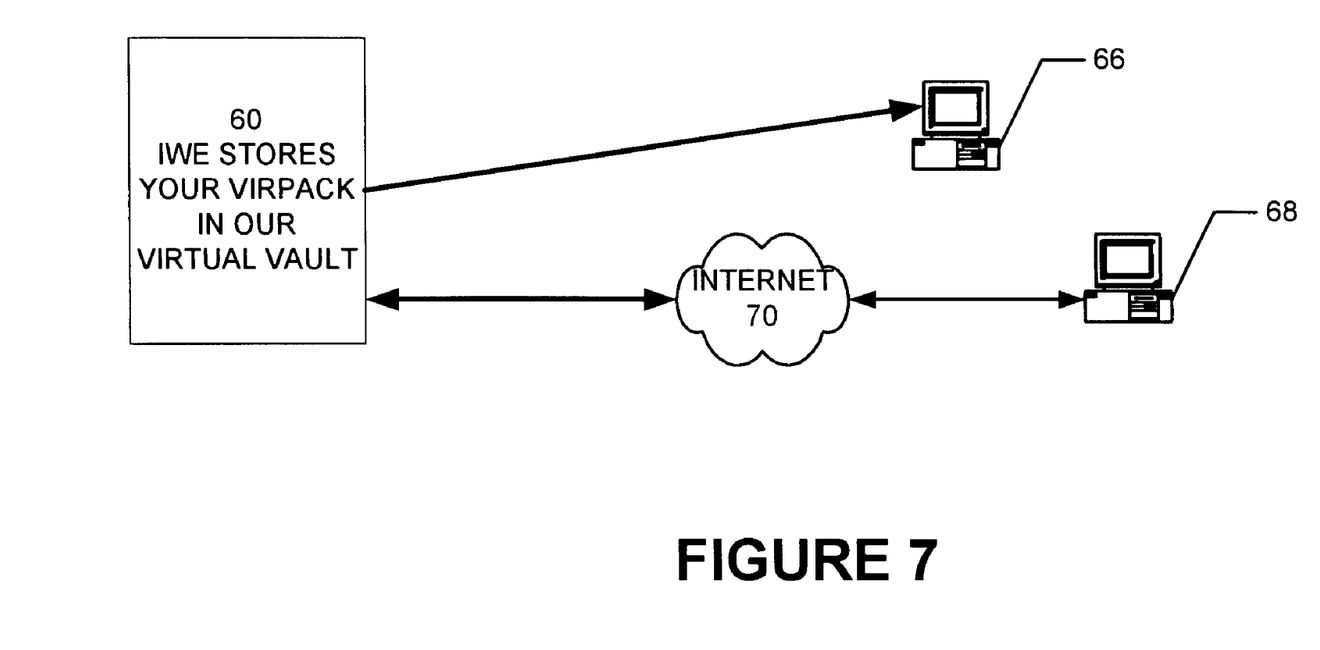
FIG. 7 illustrates the online archive of VirPacks.

Referring to FIG. 7, the online archive of Virpacks is illustrated. Processor 60 stores the various Virpack transmissions of any given customer. Multiple users 66 and 68 can then access the Virpacks that have been stored via normal communication lines or over the Internet 70.

A system and method for creating virtual document packages has now been illustrated. It will be appreciated by those skilled in the arts that the networks that are presented for the transmission of Virpack information are not meant as limitations. Indeed, any wired, or wireless network would be suitable for the transmission of information concerning the documents as well as the Virpacks themselves. In the case of a wireless network, transceivers would also be an integral part of the system for the receipt and transmission of information. Further, intranets and dedicated wire pathways are also suitable media over which to transmit Virpacks and information that gives rise to the Virpack.

The unique barcode symbol that is affixed to various documents is also not meant as a limitation. While a particular barcode symbol has been illustrated, it will also be appreciated by those skilled in the art that other types of graphical codes are also suitable for use with the present invention. The sole requirement is that they be able to store information concerning the document and other index information in the matter described herein.

I claim:

1. A method for facilitating a transaction using an electronic container comprising:

assigning a transaction identifier to the transaction, wherein the transaction identifier is unique to the transaction;

selecting data files for facilitating the transaction according to a creation template, wherein the creation template defines an order of the data files;

creating container index data, wherein the container index data comprises a list of the data files in the container in the order established by the creation template;

forming an electronic container by:
  associating the data files selected using the creation template with the unique transaction identifier; and
  associating the container index data with the unique transaction identifier;
associating a transaction participant with the unique transaction identifier; creating an access rule, wherein the access rule is indicative of a level of interaction of the transaction recipient with the electronic container; associating the access rule with the unique transaction identifier; and providing the electronic container to the transaction participant associated with the unique transaction identifier.

2. The method for facilitating a transaction of claim 1, wherein the data files are selected from the group consisting of an image, a document, a database, a computer generated file, an audio file, a video file, and an electronic data interchange file.

3. The method for facilitating a transaction of claim 1, wherein the transaction is selected from the group consisting of a loan application, a sale of real property, a sale of goods, a sale of intangible personal property, a legal settlement, a contract for services, and a contract for insurance.

4. The method for facilitating a transaction of claim 1, wherein the method further comprises creating file index data of a data file, wherein the file index data is indicative of an organization of the data file, and wherein forming an electronic container further comprises associating the file index data with the unique transaction identifier.

5. The method for facilitating a transaction of claim 4, wherein the creation template further defines the file index data to be created for the data file.

6. The method for facilitating a transaction of claim 1, wherein the method further comprises creating supplemental data to be acquired from a data file, wherein the supplemental data is indicative of the content of the data file, and wherein forming an electronic container further comprises associating the file content data with the unique transaction identifier.

7. The method for facilitating a transaction of claim 6, wherein the creation template further defines the supplemental data to be acquired from the data file.

8. The method for facilitating a transaction of claim 6, wherein the supplemental data are selected from the group consisting of a data parameter value, a field name of a data field within the data file, a field formatting characteristic, and a location coordinate of the data field within the data file.

9. The method for facilitating a transaction of claim 1, wherein the access rule is selected from the group consisting of a permission to open the electronic container, a permission to view a data file, a permission to edit a data file, a permission to edit a selected field value, a permission to print a data file, a permission to approve a data file, and a permission to disapprove a data file.

10. The method for facilitating a transaction of claim 1, wherein the creation template further defines the access rule.

11. The method for facilitating a transaction of claim 1, further comprising applying a recipient template to the electronic container, wherein the recipient template orders the data files in an order determined by the recipient template.

12. The method for facilitating a transaction of claim 1, wherein the method further comprises creating a container accounting rule, wherein the container accounting rule comprises logic for determining whether the electronic container conforms to the creator template and wherein forming an electronic container further comprises associating the container accounting rule with the unique transaction identifier.

13. A system having a memory for creating an electronic container to facilitate a transaction comprising:
  a creation template, wherein the creation template defines an ordered list of data files;
  an electronic container creator adapted for:
    assigning a transaction identifier to the transaction, wherein the transaction identifier is unique to the transaction;
    selecting data files for facilitating the transaction according to a creation template;
    creating container index data, wherein the container index data comprises a list of the data files in the container in the order established by the creation template;
    associating the data files selected using the creation template with the unique transaction identifier;
    associating the container index data with the unique transaction identifier.

14. The system of claim 13, wherein the data files are selected from the group consisting of an image, a document, a database, a computer generated file, an audio file, a video file, and an electronic data interchange file;
  associating a transaction participant with the unique transaction identifier; creating an access rule, wherein the access rule is indicative of a level of interaction of the transaction recipient with the electronic container; associating the access rule with the unique transaction identifier; and providing the electronic container to the transaction participant associated with the unique transaction identifier.

15. The system of claim 13, wherein the transaction is selected from the group consisting of a loan application, a sale of real property, a sale of goods, a sale of intangible personal property, a legal settlement, a contract for services, and a contract for insurance.

16. The system of claim 13, wherein the electronic container creator is further adapted for:
  creating file index data of a data file, wherein the file index data is indicative of an organization of the data file; and
  associating the file index data with the unique transaction identifier.

17. The system of claim 16, wherein the creation template further defines the file index data to be created for the data file.

18. The system of claim 13, wherein the electronic container creator is further adapted for:
  creating supplemental data to be acquired from a data file, wherein the supplemental data is indicative of the content of the data file; and
  associating the file content data with the unique transaction identifier.

19. The system of claim 18, wherein the creation template further defines the supplemental data to be acquired from the data file.

20. The system of claim 18, wherein the supplemental data are selected from the group consisting of a data parameter value, a field name of a data field within the data file, a field formatting characteristic, and a location coordinate of the data field within the data file.

21. The system of claim 13, wherein the access rule is selected from the group consisting of a permission to open the electronic container, a permission to view a data file, a permission to edit a data file, a permission to edit a selected field value, a permission to print a data file, a permission to approve a data file, and a permission to disapprove a data file.

22. The system of claim 13, wherein the creation template further defines the access rule.

23. The system of claim 13 further comprising a recipient viewer, wherein the recipient viewer is adapted for:
   applying a recipient template to the electronic container, and
   ordering the data files in an order determined by the recipient template.

24. The system of claim 13, wherein the electronic container creator is further adapted for:
   creating a container accounting rule, wherein the container accounting rule comprises logic for determining whether the electronic container conforms to the creator template; and
   associating the container accounting rule with the unique transaction identifier.

* * * * *